(No Model.)
J. C. GOULD.
ANIMAL TRAP.
No. 362,952. Patented May 17, 1887.
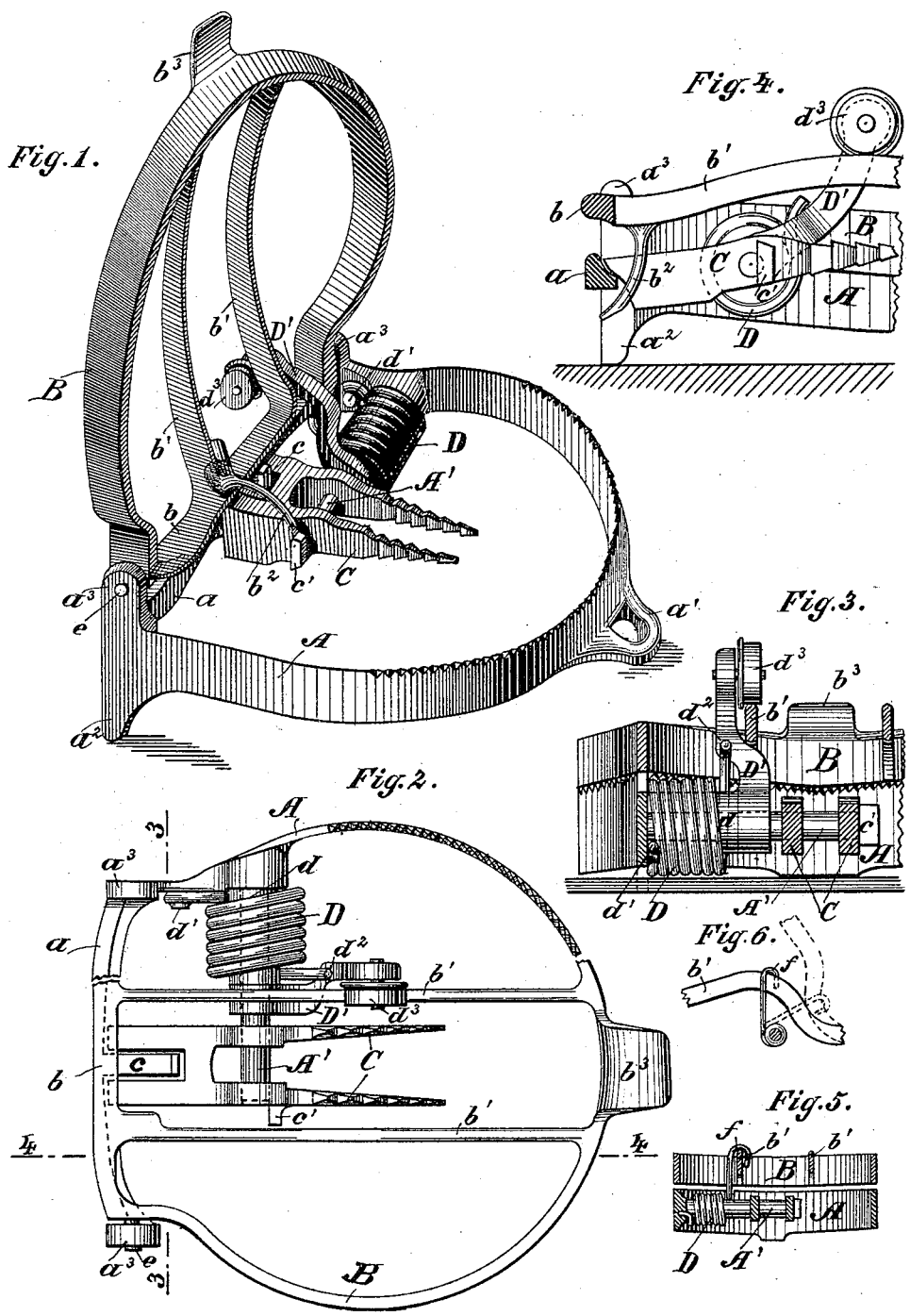
Witnesses:
H. M. Munday
Chas. Bauer
Inventor:
John C. Gould by
Munday Evarts & Adcock
his attys.

United States Patent Office.

JOHN C. GOULD, OF CHICAGO, ILLINOIS.

ANIMAL-TRAP.

SPECIFICATION forming part of Letters Patent No. 362,952, dated May 17, 1887.

Application filed March 16, 1885. Serial No. 159,065. (No model.)

*To all whom it may concern:*

Be it known that I, JOHN C. GOULD, a citizen of the United States, residing in Chicago, in the county of Cook and State of Illinois, have invented a new and useful Improvement in Animal-Traps, of which the following is a specification.

In this invention I have endeavored to cheapen the cost of manufacture to the utmost, and also to devise a trap which is efficient and easily set.

The nature of my invention is fully set forth below, and illustrated in the accompanying drawings, wherein—

Figure 1 is a perspective view of the trap in the open and set position. Fig. 2 is a plan of the same closed, the hinged top being partly removed. Fig. 3 is a partial section on line 3 3 of Fig. 2. Fig. 4 is a partial section on line 4 4 of Fig. 2. Figs. 5 and 6 show a modification.

In the drawings, A represents a frame of substantially horseshoe form, though what would otherwise be the heel extremities of the shoe are united by a cross-bar or connection, $a$. I prefer to provide this frame with feet $a'$ $a^2$, whereby to elevate it slightly. In ears $a^3$ upon the frame is hinged the spring-cover B, of like horseshoe outline, having a like connecting-bar, $b$, at the rear, and also curved ribs $b'$ extending from front to rear. These ribs prevent any approach to the bait from the rear, and from one of them depends a wire stop or arm, $b^2$.

C is a tilting bait-holder supported and swinging upon a pivot, A', projecting inwardly in a lateral direction from the frame A, and confined thereon by the projection $c$ upon the bar $a$, the holder being bifurcated to embrace said projection. I prefer to make the holder in H form, as thereby this bifurcation of the rear is obtained and also more secure attachment for the bait. When set, the stop-arm $b^2$ engages and rests upon the lateral projection $c'$ of the holder.

D is the actuating-spring for closing the trap. It encircles the sleeve $d$, cast upon the arm D', which is slipped upon the pivotal piece A', and one end of it is held by the point $d'$, cast upon the frame A, while the other end rests against arm D', said arm being bent, as shown, to form a shoulder, $d^2$, for this purpose. At its upper end the arm D' carries a roller, $d^3$, which rides upon one of the ribs $b'$, and through the medium of this arm and roller the power of the spring is transmitted to the top B.

When the trap is set, it is held open by the engagement of the stop $b^2$ with the point $c'$ upon the bait-holder. Any depressing of the bait-holding points will release this engagement, and the top will then be quickly closed by the spring. In this operation it will be noticed that the leverage exerted upon the top by the spring increases as the roller travels up the bend of the rib $b'$, and it results from this that the top is more firmly held the nearer it approaches the closed position, thus insuring the holding of any game caught in the apparatus.

In opening the trap convenience is afforded by the foot $a'$ upon the frame and the lip $b^3$ upon the top, there being sufficient room between them to permit the use of both hands.

In construction I cast the pivot A' into frame A, the stop $b^2$ and one of the hinge-pivots into the top B, and the roller-pivot (when not integral with the roller) into arm D'. When thus formed, the spring is first placed upon the sleeve of arm D', and said arm is slipped upon pivot A'. The bait-holder is next placed upon the latter, with the projection $c$ lying in its rear bifurcation. The top is next hung in the frame with the roller riding upon one of its ribs, and is then secured by the pivotal rivet $e$. The roller, it will be seen, is confined by its flange lying between the arm D' and the rib. I thus secure all the parts permanently together by a single riveting operation.

In the modification, which is more especially designed for cheaper and smaller traps, I employ a wire hook, $f$, formed in one piece with the actuating-spring, and in order that it may ride down easily upon the rib when the top is raised I prefer to give the rib a somewhat greater bend than is shown where the anti-friction roller is used.

I claim—

1. The trap composed of frame A, having cross-bar $a$, pivot A', and projections $c$ and $d'$, the top B, hinged to said frame and having cross-bar $b$, ribs $b'$, and stop-arm $b^2$, the spring D, arm D', having shoulder $d^2$ and roller $d^3$, and the bait-holder having projection $c'$, all combined and operating substantially as specified.

2. A trap consisting of the frame A $a$, a top or cover, B $b$, hinged to said frame and provided with front and rear ribs $b'$ and a stop-arm, $b^2$, a spring connected to and actuating said top, and a bait-holder with which the stop-arm contacts, all combined and operating substantially as specified.

JOHN C. GOULD.

Witnesses:
H. M. MUNDAY,
E. S. EVARTS.